US008191781B2

(12) United States Patent
Heinz et al.

(10) Patent No.: US 8,191,781 B2
(45) Date of Patent: Jun. 5, 2012

(54) METHOD AND APPARATUS FOR AUTOMATED ACCESS CONTROL SYSTEM

(75) Inventors: Theresa A. Heinz, Lake Mary, FL (US); Jack W. Craig, Oviedo, FL (US); Adam D. Piverotto, Lake Mary, FL (US)

(73) Assignee: NCR Corporation, Duluth, GA (US)

( * ) Notice: Subject to any disclaimer, the term of this patent is extended or adjusted under 35 U.S.C. 154(b) by 562 days.

(21) Appl. No.: 12/342,882

(22) Filed: Dec. 23, 2008

(65) Prior Publication Data

US 2010/0155471 A1 Jun. 24, 2010

(51) Int. Cl.
*G06F 19/00* (2011.01)

(52) U.S. Cl. ........................................................ 235/385

(58) Field of Classification Search .................. 235/385; 340/568.1; 221/151-153, 191, 282
See application file for complete search history.

(56) References Cited

U.S. PATENT DOCUMENTS

| | | | |
|---|---|---|---|
| 4,616,111 A | 10/1986 | Vasquez | |
| 4,839,505 A | 6/1989 | Bradt et al. | |
| 4,866,661 A | 9/1989 | de Prins | |
| 5,172,829 A | 12/1992 | Dellicker, Jr. | |
| 5,273,183 A | 12/1993 | Tuttobene | |
| 5,308,360 A * | 5/1994 | Neitzke et al. | 221/197 |
| 6,195,005 B1 * | 2/2001 | Maloney | 340/568.1 |
| 6,707,381 B1 * | 3/2004 | Maloney | 340/568.1 |
| 6,737,961 B2 * | 5/2004 | Flick | 340/426.35 |
| 7,234,609 B2 | 6/2007 | DeLazzer et al. | |
| 7,336,174 B1 * | 2/2008 | Maloney | 340/572.1 |
| 2003/0226772 A1 * | 12/2003 | Smith et al. | 206/37.1 |
| 2005/0216120 A1 | 9/2005 | Rosenberg et al. | |
| 2007/0169132 A1 | 7/2007 | Blust et al. | |

FOREIGN PATENT DOCUMENTS

EP 0191636 8/1986

OTHER PUBLICATIONS

CUSS Product Information brochure, 36 pages, 2007.
Website page, After hours key collection unit, www.keytracker.com, 3 pages, 2008.
Website page, PBV2 Model, www.safepakcorp.com, 2 pages, 2008.

* cited by examiner

*Primary Examiner* — Thien M. Le
*Assistant Examiner* — Christle Marshall
(74) *Attorney, Agent, or Firm* — Peter Priest

(57) ABSTRACT

An automated access control system and method in one embodiment includes a storage rack comprising a plurality of storage compartments, a user port, a memory including program instructions for placing a key within one of the plurality of storage compartments, associating the key with the one of the plurality of storage compartments, identifying a user, associating the user and the stored key, removing the stored key from the one of the plurality of storage compartments, and making the removed key accessible to the user at the user port, and a processor operably connected to the memory for executing the program instructions.

20 Claims, 6 Drawing Sheets

METHOD AND APPARATUS FOR AUTOMATED ACCESS CONTROL SYSTEM

FIELD OF THE INVENTION

The present invention relates to self-service kiosks and more particularly to devices for dispensing and receiving articles, and more particularly to an automated device for control of access to keys.

BACKGROUND OF THE INVENTION

Self-service terminals include kiosks. Kiosks provide a publicly accessible computing platform. Kiosks may be located within a retailer's transaction establishment or elsewhere, such as at airport terminals. Kiosks may be easily networked to World Wide Web (web) sites for displaying web pages and other web-delivered content from web sites. Web pages from web sites may be displayed using known and available web software, such as Microsoft® Internet Explorer software.

Automated devices such as the dispensing or vending machines disclosed in U.S. Pat. Nos. 3,979,017, 4,120,452, and 4,630,042 permit an article to be selected from a variety of articles and dispensed to an individual user or consumer. U.S. patent application Ser. No. 11/686,862, discloses a system and method of dispensing disc-based media and other consumer products. A user can interact with an automated business system to select disc-based media for rental and/or purchase. The automated business system can retrieve the selection from the interior of the automated business system and dispense the selection through a port to the user. The automated business system can retrieve the selection from the port in a return process.

Some aspects of automated systems have been incorporated into fields wherein a hotel or vehicle key is provided to a consumer. Thus, U.S. Pat. Nos. 4,752,876, 4,661,806, and 4,631,358 disclose devices which dispense stored keys to an externally accessible location when a hotel guest "checks in." Key dispensers are typically gravity driven systems wherein the key is gravity fed to a customer though a chute. These systems may further include a slot or compartment whereby a key may be deposited. The deposited key, however, is not identified by the system upon deposition. Thus, once a key is returned, an employee must access the system to remove and sort the keys that have been returned.

An automated access control system which provides automated storing of an item such as a key and later access to the stored item is needed.

SUMMARY OF THE INVENTION

An automated access control system and method in one embodiment includes a storage rack comprising a plurality of storage compartments, a user port, a memory including program instructions for placing a key within one of the plurality of storage compartments, associating the key with the one of the plurality of storage compartments, identifying a user, associating the user and the stored key, removing the stored key from the one of the plurality of storage compartments, and making the removed key accessible to the user at the user port, and a processor operably connected to the memory for executing the program instructions.

In a further embodiment, a method of automatically controlling access to a key includes controlling an inventory control assembly to place a key within one of a plurality of storage compartments, associating the key with the one of the plurality of storage compartments, identifying a user, associating the user and the stored key, controlling the inventory control assembly to remove the key from within the one of a plurality of storage compartments, and providing access to the removed key at a user port.

In yet another embodiment, a method of automatically controlling access to a key includes placing a key within a kiosk, identifying the placed key, moving the identified key to a selected storage compartment, storing data associating the identified key with the selected storage compartment in an inventory database, identifying the selected storage compartment using the stored association data, retrieving the key from the storage compartment based upon the identity of the storage compartment, and releasing the retrieved key to a user.

The above described features and advantages, as well as others, will become more readily apparent to those of ordinary skill in the art by reference to the following detailed description and accompanying drawings.

DETAILED DESCRIPTION

Figure 1:
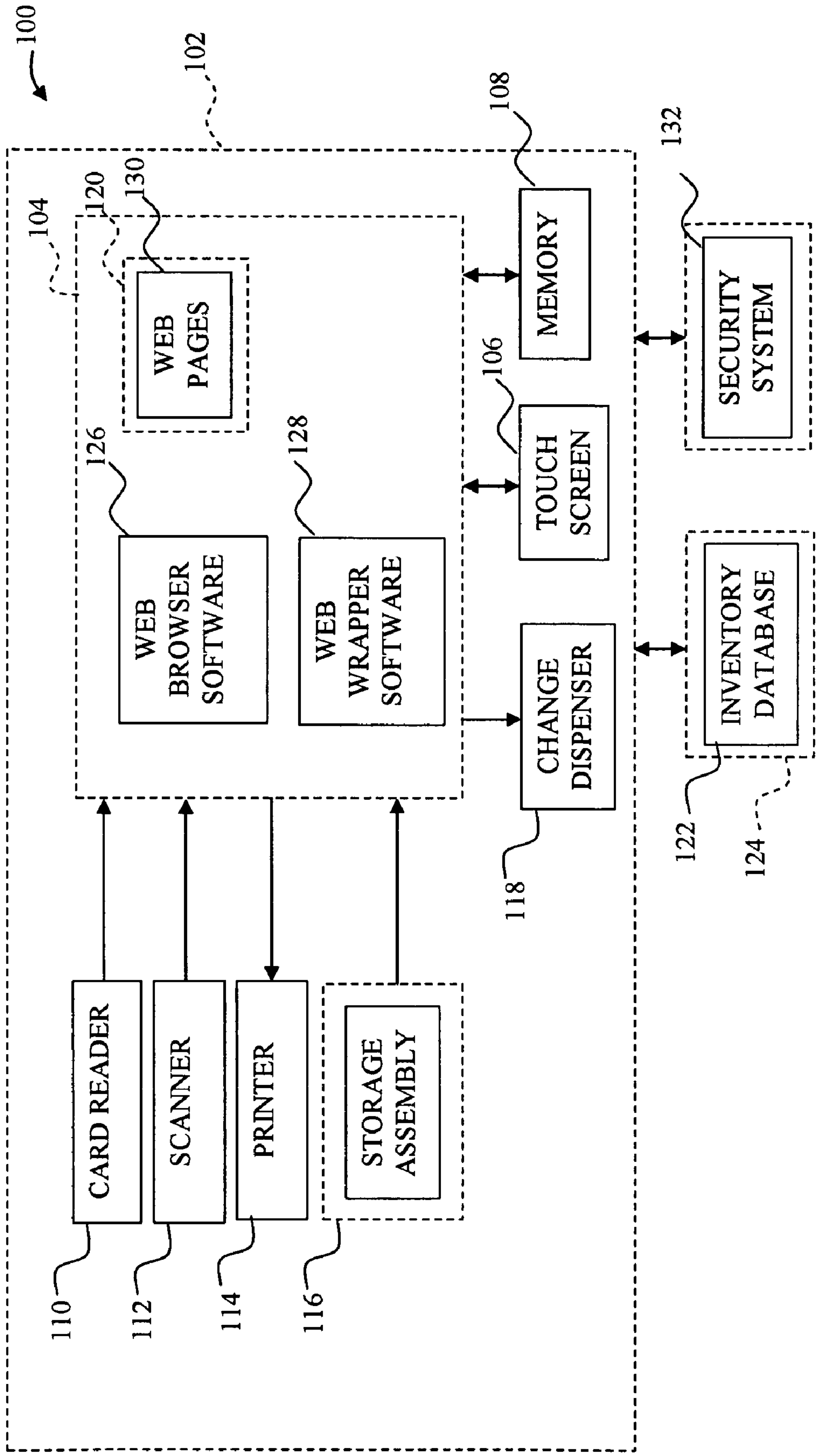
FIG. 1 is a block representation of an automated access control system in the form of a self-service kiosk in accordance with principles of the invention.

Referring to FIG. 1, there is depicted an automated access control system 100 which includes a self-service terminal 102. The self-service terminal 102 may include an NCR 7401 computer. The self-service terminal 102 includes a processor circuit 104, a touch screen 106, and a memory 108. The memory 108 stores program instructions which are executed by the processor 104. The self-service terminal 102 may include a number of peripherals such as a card reader 110, a printer 112, a scanner 114, an inventory control assembly 116, and a change dispenser 118. Other peripherals such as a cash acceptor, check reader, barcode reader, etc. may be included.

The processor circuit 104 may suitably be a general purpose computer processing circuit such as a microprocessor and its associated circuitry. The processor 104 is operable to carry out the operations attributed to it herein. The processor circuit 104 executes self-service application 120 which processes customer requests, such as rental related requests. For example, a customer may use the self-service application 120 to complete a rental agreement or to complete a rental return. Customer input may be provided through the use of the touch screen 106 which may display a keypad or other graphical interface.

The self-service application 120 displays instructions for entering customer requests such as key drop-off procedure, and controls recordation of transaction data which may include drop-off time, mileage, fuel tank level, and vehicle condition information, recordation of any payments due, dispensation of change due, printing of receipts, and rental information updates in an inventory database 122 which in this embodiment is located within a server 124. The self-service application 120 communicates with the server 124 through a network connection which may be wireless. In one embodiment, the self-service application 120 utilizes the TCP/IP protocol.

The processor 104 further executes the web browser software 126 and the web wrapper software 128. The web browser software 126 allows an operator to display information in a format established by the World Wide Web (WWW or "web"). The self-service application 120 may be written as a web application which displays rental information in the form of web pages 130. Alternatively, the self-service application 120 may be a non-web application and operate without web browser software 126.

The web browser software 126 may include commercially available web browser software, such as Microsoft® Internet Explorer web browser software. Microsoft® Internet Explorer web browser software is configured into a kiosk operation using a "-k" command line option. This option hides tool bars and menu bars to prevent customer access to those functions.

The web browser software 126 may also display a start or "home" page within web pages 130 which operates as a default page from which kiosk operation begins and to which operation returns when an operator is finished using the self-service terminal 102.

The web wrapper software 128 provides security functions. During operation, the web wrapper software 128 prevents an operator from accessing kiosk files, or other applications, and from operating system software or basic input-output system (BIOS) firmware, and prevents the operator from causing the self-service terminal 102 to reboot.

The card reader 110 reads customer identification, credit, debit, SMART, and/or other types of cards carried by a customer. The card reader 110 may record payment information from a customer. The card reader 110 may further incorporate wireless technology to receive customer identification data from a wireless device carried by the customer.

The scanner 112 scans a customer's driver's license and/or other form of identification such as a passport. The scanner 112 may be operated in conjunction with the security system 132, which may include one or more cameras or other sensors, to ascertain the identity of the customer.

Figure 2:
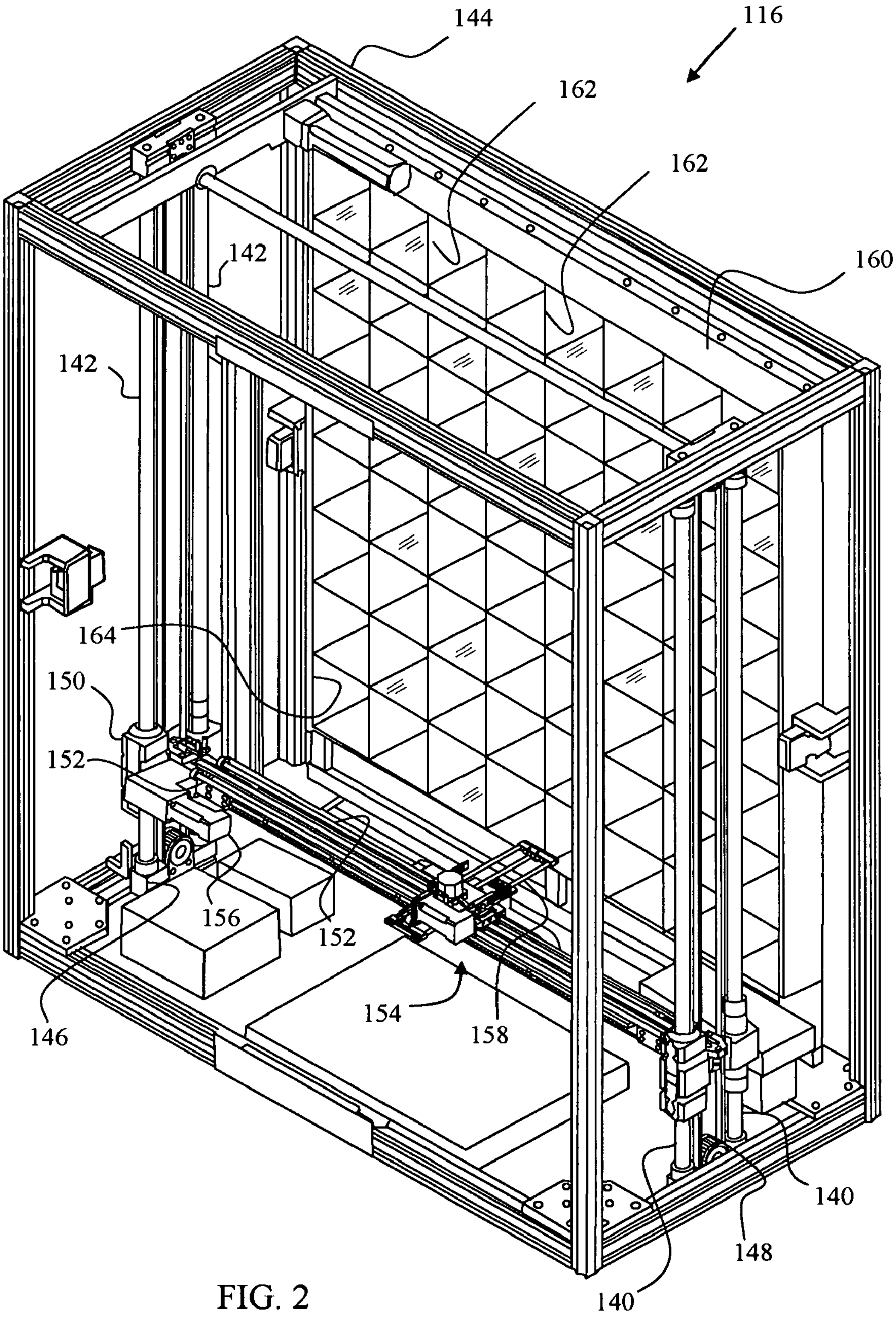
FIG. 2 depicts a partial perspective view of the inventory control system of FIG. 1.

The inventory control assembly 116 may suitably be a device similar to one of the devices disclosed in U.S. patent application Ser. No. 11/686,862, of Blust et al., filed on Mar. 15, 2007, the contents of which are herein incorporated by reference. One such device, inventory control assembly 116, is shown in FIG. 2. The inventory control assembly 116 includes a guide rail pair 140 and a guide rail pair 142 supported by a frame 144. The guide rail pair 142 supports a driven pulley assembly 146 and the guide rail pair 140 supports a passive pulley assembly 148.

The guide rail pair 140 and the guide rail pair 142 support a carriage assembly support system 150. The driven pulley assembly 146 and the passive pulley assembly 148 are used to position the carriage assembly support system 150 at a height along the guide rail pair 140 and the guide rail pair 142 under the control of the processor circuit 104.

The carriage assembly support system 150 includes a guide rail pair 152, a carriage assembly 154, and a motor 156. The motor 156 is operable to position the carriage assembly 154 at a location along the guide rail pair 152 under the control of the processor circuit 104 as discussed below. A gripper mechanism 158 is located on the carriage assembly 154.

The frame 144 also supports a storage rack 160. The storage rack 160, in this embodiment, includes a number of identically shaped storage compartments 162. The gripper mechanism 158 is configured to be extended into a selected one of the storage compartments 162 to grip an item located therein. A user port 164 is located in the storage rack 160. The user port 164 is accessible, on one side, to the gripper mechanism 158 and, on the other side, to a user under the control of the processor circuit 104.

Figure 3:
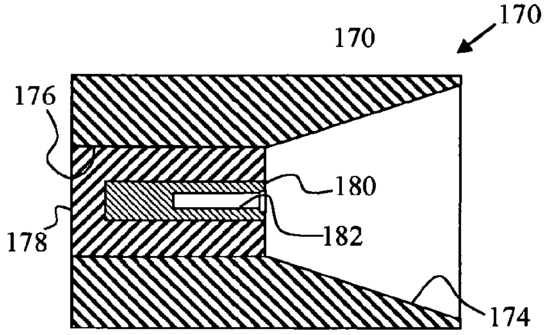
FIG. 3 depicts a simplified cross sectional view of a key retaining mechanism used in the inventory control system of FIG. 2.
Figure 4:
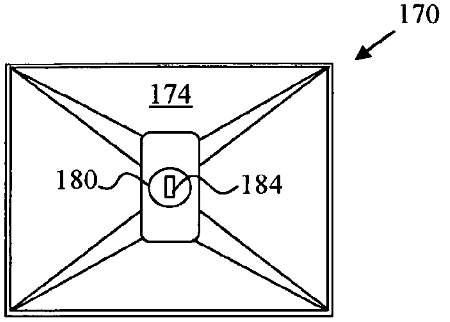
FIG. 4 depicts a front plan view of the key retaining mechanism used in the inventory control system of FIG. 2.

In one embodiment, a key retaining mechanism 170, shown in simplified form in FIGS. 3 and 4, is configured to be removably placed within a storage compartment 162. The key retaining mechanism 170 includes a housing 172 which defines a tapered bore 174 which extends from one end of the housing 172 to a bore 176. A key holder 178 is slidably positioned within the bore 176. The key holder 178 includes a cylinder 180 with a shank bore 182 which opens to the tapered bore 174 through a slot 184.

Figure 5:
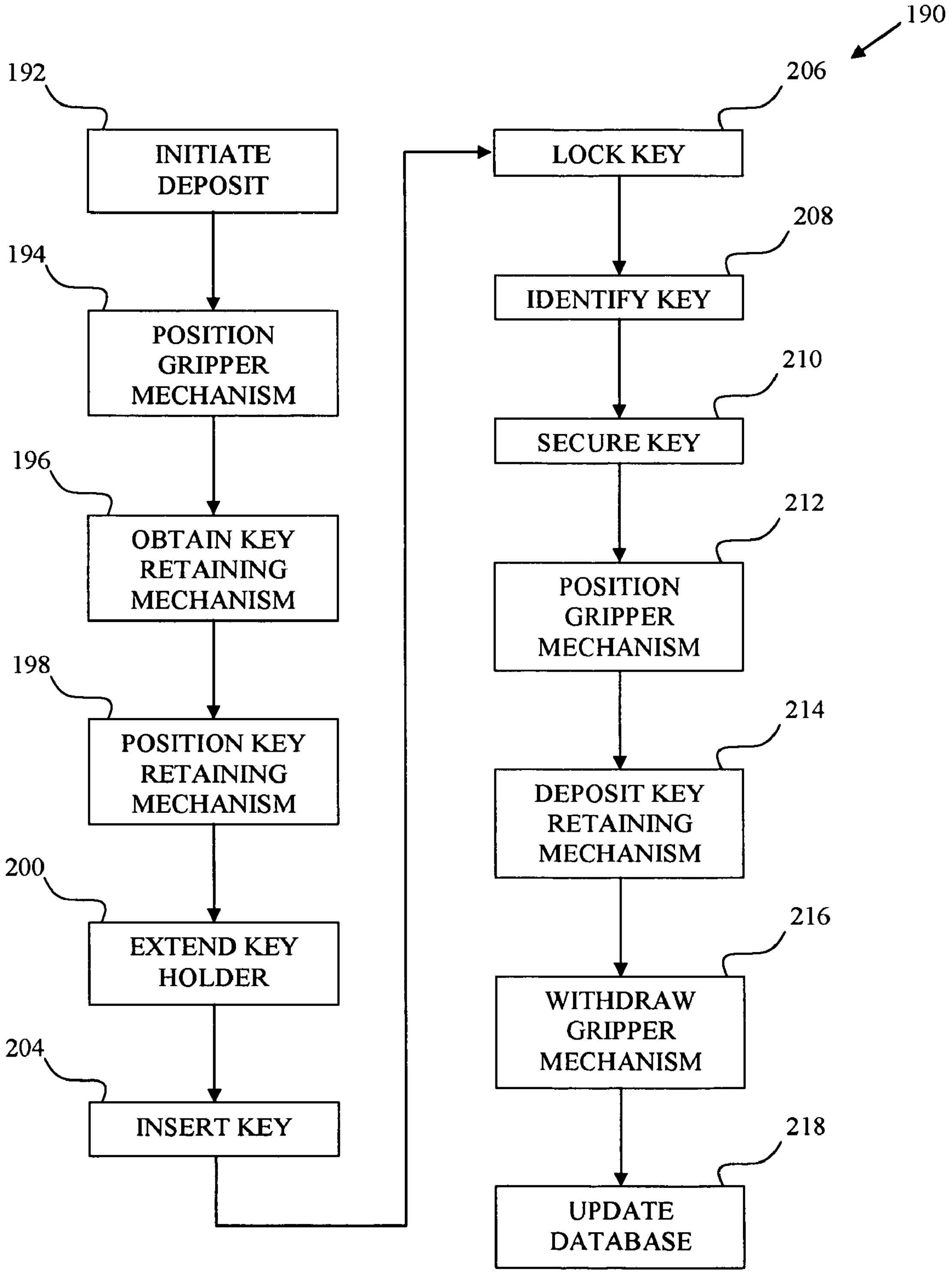
FIG. 5 is a flowchart of an exemplary overview of a manner of operation of the automated access control system of FIG. 1 for storing a key within the system.

Referring to FIG. 5, there is depicted a flowchart, generally designated 190, setting forth an exemplary manner of operation of the automated access control system 100 to process a key into the system 100. Thus, in a car pool scenario, the keys for the various automobiles available for use are placed in the inventory control assembly 116. Similarly, a key for a rental vehicle may be placed into the inventory control system 116. Initially, a key retaining mechanism 170 is provided in each of the storage compartments 162. Processing a key into the system 100 may begin at block 192 when an operator initiates the procedure 190 using the touch screen 106. Initiation of the procedure may include uniquely identifying the user to the system 100 using one or more of the touch screen 106, the card reader 110, the scanner 112, and the security system 132. In response, the processor circuit 104 executes program instructions stored in the memory 108 to control the inventory control assembly 116.

At the block 194, the gripper mechanism 158 is positioned adjacent to a storage compartment 162 containing an empty key retaining mechanism 170. The processor circuit 104 may identify an appropriate compartment 162 using data stored in the inventory database 122. The gripper mechanism 158 is controlled to extend into the selected storage compartment 162 and grip the key retaining mechanism 170 stored therein at block 196. The gripper mechanism 158 may be configured in any acceptable manner for coupling with the key retaining mechanism 170 including the use of keyed components, magnets, movable arms, etc.

The key retaining mechanism 170 is then withdrawn from the storage compartment 162 and the driven pulley assembly 146 and the carriage assembly support system 150 are controlled at block 198 to position the key retaining mechanism 170 at the user port 164. The gripper mechanism 158 at block 200 slides the key holder 178 from the secured position shown in FIG. 3 to an extended position shown in FIG. 6 wherein the key holder 178 has been moved into the tapered bore 174.

Figure 6:
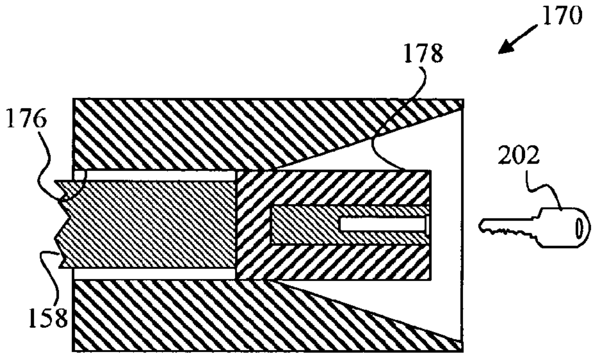
FIG. 6 depicts a simplified cross sectional view of the key retaining mechanism of FIG. 3 showing the key holder positioned by the gripper mechanism in an extended position.
Figure 7:
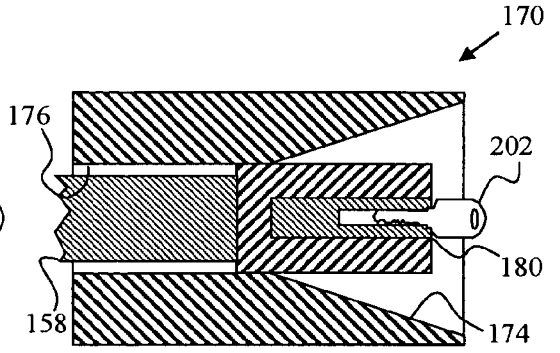
FIG. 7 depicts a simplified cross sectional view of the key retaining mechanism of FIG. 3 showing a key removably positioned in the extended key holder.
Figure 8:
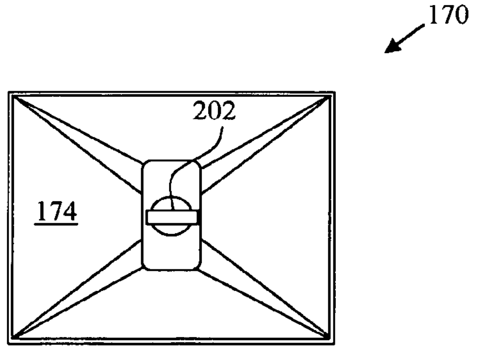
FIG. 8 depicts a front plan view of the key retaining mechanism of FIG. 3 showing a key rotated to a locked position in the key holder.

Once in the extended position shown in FIG. 6, a key 202 may be inserted into the key holder 178. Once the key 202 is inserted into the key holder 178 at block 204 (see FIG. 7), the key 202 is used to rotate the cylinder 180 to a locked position at block 206 as shown in FIG. 8. Once locked, the key 202 is identified by the inventory control system 116 at block 208. Identification of the key 202 may be accomplished in a number of different ways. In one embodiment, the key 202 incorporates a chip or an RFID device which is read by the inventory control system 116. To this end, a reader may be positioned on the gripper mechanism 158 or within the key retaining mechanism 170. Alternatively, the shape of the shank of the key 202 may be used to uniquely identify the key 202.

Figure 9:
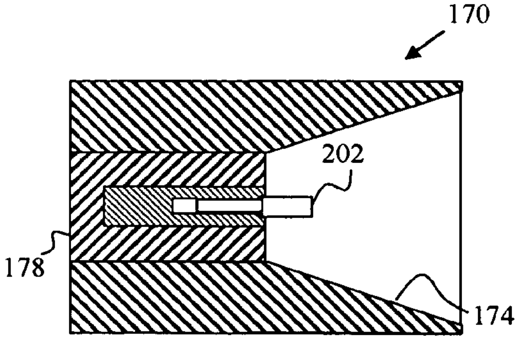
FIG. 9 depicts a simplified cross sectional view of the key retaining mechanism of FIG. 3 showing a key rotated to a locked position and the key holder withdrawn to a secure position.

Once the key 202 has been identified, the gripper mechanism 158 pulls the key holder 178 back into the bore 176 to a secured position as shown in FIG. 9 at block 210. As the key holder 178 is pulled into the bore 176, any key chain attached to the key 202 is guided by the tapered bore 174 to a position within the confines of the housing 172 to prevent fouling of the inventory control system 116. In the secured position, rotation of the key holder 178 is inhibited.

At block 212, the processor circuit 104 controls the inventory control assembly 116 to move the gripper mechanism 158 from the position adjacent to the user port 164 to a position adjacent to the storage compartment 162 from which the key retaining mechanism 170 was obtained. The gripper mechanism 158 is controlled to deposit the key retaining mechanism 170 within the storage compartment 162 at block 214. The gripper mechanism 158 is then withdrawn from the storage compartment 162 at block 216.

At block 218, the processor circuit 104 updates the inventory database 122 to reflect the location of the key 202 within the storage rack 160. If desired, the key 202 located within the storage compartment 162 may further be associated with the user identified at block 192. Association of the particular key 202 with the individual depositing the key 202 may be used in systems deployed to allow for after-hours drop off of vehicles such as at service stations or car rental return locations.

If desired, the key stored within the automated access control system 100 may be immediately accessed by the user. Thus, in the event a customer has inadvertently left an item in a vehicle, the customer can immediately obtain the key from the automated access control system 100.

Figure 10:
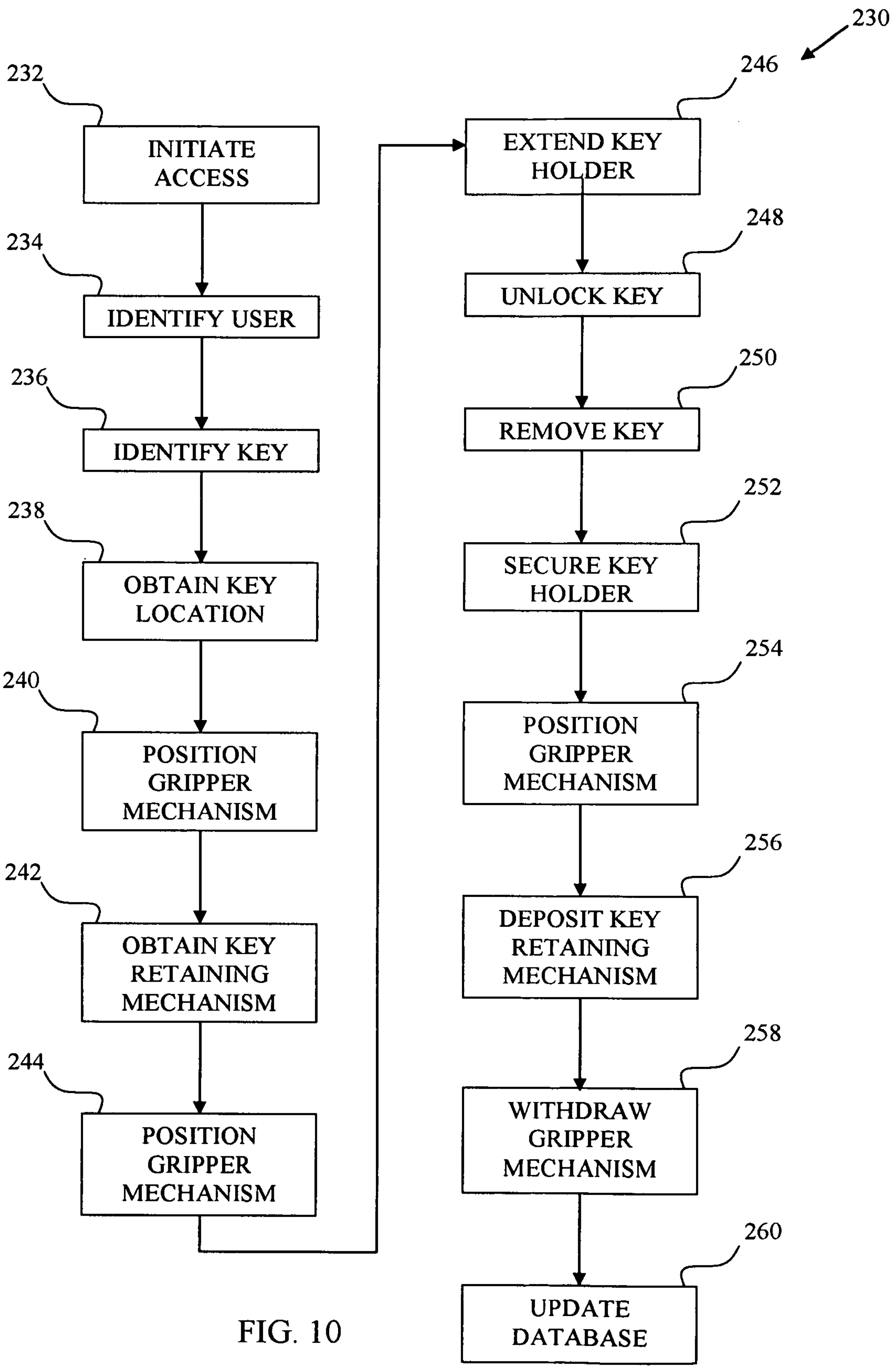
FIG. 10 is a flowchart of an exemplary overview of a manner of operation of the automated access control system of FIG. 1 for accessing a stored key within the system.

Access to a key previously stored within the automated access control system 100 is described with reference to the flowchart 230 of FIG. 10. At block 232, the access process is initiated and at block 234 a user identity is established. User identity may be accomplished in a number of alternative ways. By way of example, an access code may be entered into the system using the touch screen 106, a document may be scanned using the scanner 112 and verified using a program stored within the memory 108 or by transmission to a remote site for viewing by an individual, or a camera or biometric sensor in the security system 132 may obtain data identifying the user.

The automated access control system 100 identifies the key to which access will be provided at the block 236. The appropriate key may be established in a variety of different ways depending upon the manner in which the automated access control system 100 is operated. In a rental embodiment or an after-hours vehicle pick-up embodiment, the processor circuit 104 may associate the customer with a previously stored reservation or job order. Alternatively, a rental customer may be guided by the automated access control system 100 to complete a rental agreement following which, a particular key is identified.

Figure 11:
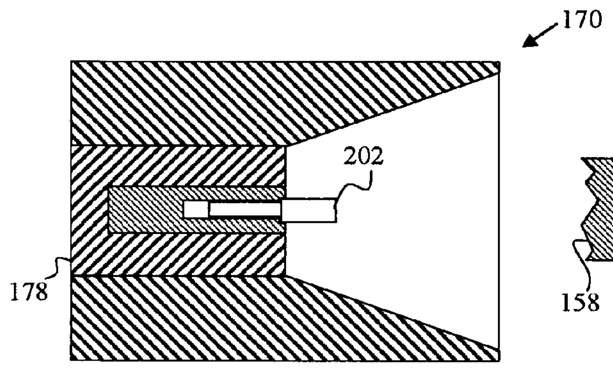
FIG. 11 depicts a simplified cross sectional view of the key retaining mechanism of FIG. 3 showing a key rotated to a locked position and the key holder in a secure position after retrieving the key retaining mechanism from a storage compartment.

Once a particular key is identified, the location data for the identified key is obtained from the inventory database 122 at block 238. The processor circuit 104 executes program instructions stored in the memory 108 at block 240 to control the gripper mechanism 158 to a position adjacent to the storage compartment 162 wherein the identified key has been stored. The gripper mechanism 158 is controlled to extend into the storage compartment 162 and grip the key retaining mechanism 170 holding the identified key at block 242. The key retaining mechanism 170 is then withdrawn from the storage compartment 162 and the driven pulley assembly 146 and the carriage assembly support system 150 are controlled at block 244 to position the key retaining mechanism 170 at the user port 164. The gripper mechanism 158 at block 246 slides the key holder 178 from the secured position (see FIG. 11) to the extended position (see FIG. 12) wherein the key holder 178 has been moved into the tapered bore 174.

Figure 12:
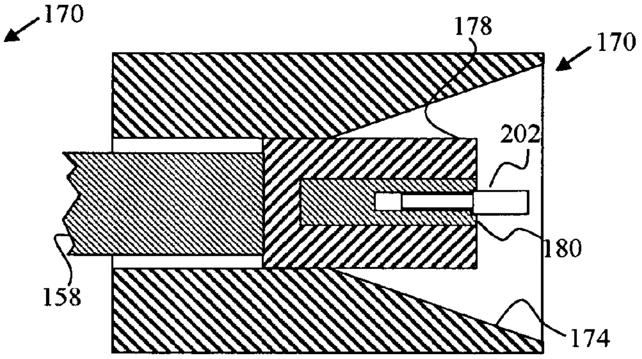
FIG. 12 depicts a simplified cross sectional view of the retrieved key retaining mechanism of FIG. 11 with the key holder extended by the gripper mechanism.
Figure 13:
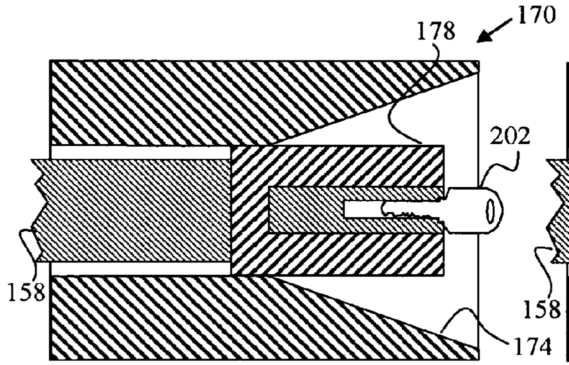
FIG. 13 depicts a simplified cross sectional view of the key retaining mechanism of FIG. 12 showing the key rotated to an unlocked position.
Figure 14:
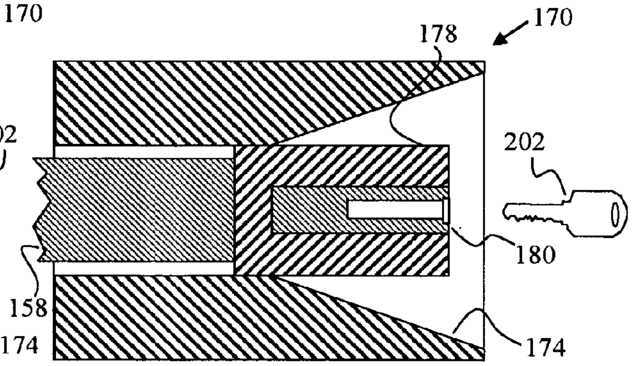
FIG. 14 depicts a simplified cross sectional view of the key retaining mechanism of FIG. 13 after the key has been removed from the key holder.

Once in the extended position shown in FIG. 12, the customer may be prompted remove the key 202 by first rotating the key 202 to the unlocked position at block 248. Once the key 202 is in the unlocked position as shown in FIG. 13, the customer may remove the key 202 from the key retaining mechanism 170 at block 250. At block 252, the key holder 178 is withdrawn into the bore 176 and the processor circuit 104 controls the inventory control assembly 116 to move the gripper mechanism 158 from the user port to a position adjacent to the storage compartment 162 from which the key retaining mechanism 170 was obtained at block 254.

The gripper mechanism 158 is controlled to deposit the key retaining mechanism 170 within the storage compartment 162 at block 256. The gripper mechanism 158 is then withdrawn from the storage compartment 162 at block 258. At block 260, the processor circuit 104 updates the inventory database 122 to reflect the availability of the key retaining mechanism 170 for receiving another key. Additionally, the inventory database 122 is updated to reflect that the key 202 previously stored in the key retaining mechanism 170 has been removed by the customer identified in the block 234.

The foregoing processes may be modified in a number of ways within the scope of the following claims. By way of example, many of the steps may be performed in different sequences. Additionally, the identity of the keys which are allowed to be used with the automated access control system 100 may be pre-established by storing data uniquely identified with the key in the inventory database 122. In such embodiments, the process 190 is modified such that if a key is identified at the block 208 which does not match a pre-established key identity, the key is not secured at block 210 and a warning message is displayed for the user by the self-service application.

Additionally, the automated access control system 100 may be configured to perform additional tasks upon deposition of a key therein. By way of example, upon deposition of an identified key, the automated access control system 100 may be configured to issue a signal causing all of the vehicle doors to be locked and/or to disable vehicle operation. Additionally, the automated access control system 100 may be configured to issue a communication to a remote location notifying the remote location of the deposit of the key. Furthermore, the automated access control system 100 may be configured to establish communications with the vehicle to obtain various data including mileage, fluid levels, etc. This data may be used to facilitate, for example, the return procedure for a rental vehicle.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

The invention claimed is:

1. An automated access control system comprising:

a storage rack comprising a plurality of storage compartments;

a user port;

a key retaining mechanism for retaining a key as the key is transported with the key retaining mechanism from one of the storage compartments to the user port where the key is released to a user and the key retaining mechanism is held within the automated access control system;

a memory including program instructions for placing the key retained in the key retaining mechanism within one of the plurality of storage compartments, associating the key with the one of the plurality of storage compartments, identifying a user, associating the user and the key, removing the key from the one of the plurality of storage compartments, and making the key accessible to the user at the user port; and a processor operably connected to the memory for executing the program instructions.

2. The system of claim 1, further comprising:

an inventory control assembly, the inventory control assembly configured to access each of the plurality of storage compartments and the user port.

3. The system of claim 2, wherein:

the retaining mechanism is configured to be removably positioned within the plurality of storage compartments and further comprises a key receiving cylinder which is rotated with the key to a locked position.

4. The system of claim 3, further comprising a plurality of the key retaining mechanisms and wherein the inventory control assembly comprises a gripper mechanism configured to couple with each of the plurality of key retaining mechanisms.

5. The system of claim 1, wherein the memory further includes program instructions for:

uniquely identifying the key received by the automated access control system once the key receiving cylinder is rotated to the locked position.

6. The system of claim 5, wherein the program instructions for uniquely identifying a key received by the automated access control system comprise program instructions for receiving input from a user for use in uniquely identifying the received key.

7. The system of claim 5, wherein the program instructions for uniquely identifying a key received by the automated access control system comprise program instructions for receiving data from a wireless link for use in uniquely identifying the received key.

8. The system of claim 7, wherein the key is for a vehicle, and further comprising:

a radio frequency identification receiver for receiving data from a wireless link established with the key for use in uniquely identifying the received key; and means for issuing a signal causing all of the vehicle doors to be locked or to disable the vehicle.

9. A method of automatically controlling access to a key comprising:

controlling an inventory control assembly to place a key within one of a plurality of storage compartments;

locking a key in a key retaining mechanism;

associating the key in the key retaining mechanism with the one of the plurality of storage compartments;

identifying a user;

associating the user and the stored key;

controlling the inventory control assembly to remove the key and the retaining mechanism from within the one of a plurality of storage compartments; and providing access to the removed key at a user port thereby allowing the user to unlock and remove the key while the key retaining mechanism is held within the inventory control assembly.

10. The method of claim 9, wherein controlling the inventory control assembly to remove the key from within the one of a plurality of storage compartments comprises:

coupling the key retaining mechanism located in an identified one of the plurality of storage compartments with a gripper mechanism; and withdrawing the key retaining mechanism from the identified storage compartment with the gripper mechanism.

11. The method of claim 10, wherein coupling the key retaining mechanism comprises:

extending the gripper mechanism toward the identified storage compartment.

12. The method of claim 9, further comprising:

uniquely identifying the key to be placed within one of a plurality of storage compartments; and storing the unique identification of the key, wherein associating the user and the stored key comprises:

associating user specific data with the stored unique key identification data.

13. The method of claim 12, wherein uniquely identifying the key comprises:

inputting user specific data to a self-service kiosk.

14. The method of claim 12, wherein uniquely identifying the key comprises:

receiving data from a wireless link.

15. The method of claim 14, wherein uniquely identifying the key comprises:

receiving data from a wireless link established with the key.

16. A method of automatically controlling access to a key comprising:

placing a key in a key retaining mechanism within a kiosk;

identifying the placed key;

moving the identified key in the key retaining mechanism to a selected storage compartment;

storing data associating the identified key with the selected storage compartment in an inventory database;

identifying the selected storage compartment using the stored association data;

retrieving the key from the storage compartment based upon the identity of the storage compartment; and releasing the retrieved key to a user while the key retaining mechanism is held within the kiosk.

17. The method of claim 16, further comprising:

positioning the retrieved key proximate to a user port in the kiosk.

18. The method of claim 16, further comprising;

updating the inventory database to reflect release of the retrieved key to the user.

19. The method of claim 16, wherein the key retaining mechanism includes a key receiving cylinder which is rotated with the key to a locked position, and identifying the placed key comprises:

obtaining key identification data from the key upon detection that the key has been inserted into the key receiving cylinder and has rotated the cylinder to the locked position;

comparing the obtained key identification with stored key identification; and enabling moving the identified key to a selected storage compartment based upon the comparison.

20. The method of claim 16, wherein identifying the placed key comprises:

emitting a signal from the kiosk; and receiving key identification data from the key in response to the emitted signal.

* * * * *